United States Patent
Searcy et al.

(10) Patent No.: US 9,952,319 B2
(45) Date of Patent: Apr. 24, 2018

(54) RESIDUE CANCELLATION FOR AUTOMATED VEHICLE MIMO RADAR

(71) Applicant: DELPHI TECHNOLOGIES, INC., Troy, MI (US)

(72) Inventors: James F. Searcy, Westfield, IN (US); Alebel Hassen Arage, Carmel, IN (US); Stephen W. Alland, Newbury Park, CA (US); Siyang Cao, Tucson, AZ (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 334 days.

(21) Appl. No.: 14/962,092

(22) Filed: Dec. 8, 2015

(65) Prior Publication Data
US 2017/0160380 A1    Jun. 8, 2017

(51) Int. Cl.
*G01S 13/28* (2006.01)
*G01S 7/292* (2006.01)
(Continued)

(52) U.S. Cl.
CPC .......... *G01S 13/288* (2013.01); *G01S 7/2921* (2013.01); *G01S 7/038* (2013.01); *G01S 13/42* (2013.01);
(Continued)

(58) Field of Classification Search
CPC ...... G01S 13/288; G01S 7/292–7/2921; G01S 13/42; G01S 7/038; G01S 2007/2883; G01S 13/931; H04B 7/0413
See application file for complete search history.

(56) References Cited

U.S. PATENT DOCUMENTS

| 5,124,710 A | 6/1992 | Debuisser |
| 7,474,262 B2 | 1/2009 | Alland |
| 2011/0084879 A1 | 4/2011 | Brown et al. |

FOREIGN PATENT DOCUMENTS

EP    2 717 067 A1    4/2014

OTHER PUBLICATIONS

Changzheng, Ma, et al.: "Zero Correlation Zone Codes and Extended Zero Correlation Zone Codes for MIMO radar signal separation", Oct. 24, 2010, pp. 2345-2348.
(Continued)

*Primary Examiner* — Matthew M Barker
(74) *Attorney, Agent, or Firm* — Lawrence D. Hazelton (57) ABSTRACT

A Pseudo-Random Phase Modulation (PRPM) multiple-input-multiple-output (MIMO) radar system suitable for use on an automated vehicle includes a first transmit-antenna that transmits a first transmit-signal generated by a first PRPM-code, a second transmit-antenna that transmits a second transmit-signal generated by a second PRPM-code, a receive-antenna used to detect a first reflected-signal arising from the first transmit-signal and a second reflected-signal arising from the second transmit-signal, and a controller. The controller is in communication with the receive-antenna and is operable to generate the first PRPM-code and the second PRPM-code. The controller is configured to generate a first sub-channel-output based on a down-converted-signal from the receive-antenna and the first PRPM-code, generate a second sub-channel-output based on the down-converted-signal from the receive-antenna and the second PRPM-code, determine a first residue-signal based on the second sub-channel-output, and determine a first residue-removed-signal by subtracting the first residue-signal from the first sub-channel-output.

8 Claims, 7 Drawing Sheets

(51) Int. Cl.
   *H04B 7/0413*   (2017.01)
   *G01S 7/03*   (2006.01)
   *G01S 13/42*   (2006.01)
   *G01S 13/93*   (2006.01)
   *G01S 7/288*   (2006.01)

(52) U.S. Cl.
   CPC ..... *G01S 13/931* (2013.01); *G01S 2007/2883* (2013.01); *H04B 7/0413* (2013.01)

(56) References Cited

OTHER PUBLICATIONS

Christian, Sturm, et al.: "Waveform Design and Signal Processing Aspects for Fusion of Wireless Communications and Radar Sensing", Jul. 7, 2011, pp. 1236-1259.

Sammartino, P. F., et al.: "Efficient signal processing in MIMO radars", Oct. 12, 2011, pp. 13-16.

Majumder, Uttam, K, et al.: "A novel approach for designing diversity radar waveforms that are orthogonal on both transmit and receive", Apr. 29, 2013, pp. 1-6.

Slow Time Random Phase-Coded Waveforms in MIMO OTHR by Zhiguo Zhao, Jianwen Chen, and Zheng Baa was published in the 10th International Symposium on Antennas, Propagation & EM Theory (ISAPE) in 2012.

MIMO Imaging Radar with Enhanced Range-Azimuth Sidelobe Suppression by T.Takayama, Y. Tokieda, and H. Sugawara was published in the Proc. IET Int. Radar Conf. in 2012.

FIG. 7B

RESIDUE CANCELLATION FOR AUTOMATED VEHICLE MIMO RADAR

TECHNICAL FIELD OF INVENTION

This disclosure generally relates to a multiple-input-multiple-output (MIMO) radar system, and more particularly relates to the cancellation of signal residue arising from demodulation of a received signal.

BACKGROUND OF INVENTION

Automotive radar sensors are widely used in automated vehicle sensing systems in order to provide information about the surrounding environment to control operation of the automated vehicle and/or to use in Advanced Driver Assistance Systems (ADAS) features. Radar systems may employ a variety of techniques to determine or measure the angle of arrival of a reflected signal. In this way, the angular direction of an object can be estimated. One technique known as Digital Beamforming uses an array of antennas to receive a signal that was reflected by an object. By analyzing the relative phase of the reflected signal across the array of antenna elements the angle from which the signal is received can be determined.

For a MIMO radar system, a receive antenna will receive signals from multiple transmit antennas. For example in a MIMO radar system with two transmit (Tx) antennas and one receive (Rx) antenna, the signals from the two transmit antennas are somehow separated or distinguished upon receiving them to effectively form two receive antenna channels. This concept can be extended to M individual Tx antennas, received by N individual Rx antennas to give an equivalent array of N*M antennas. The positions of the N*M antennas of the equivalent array are just the spatial convolution of the Tx antenna positions and the Rx antenna positions.

Radar systems for fully-automated and semi-automated driving applications that use a Multiple-Input Multiple-Output (MIMO) radar concept with a synthetic-aperture technique from multiple transmit and receive antenna elements have been proposed. This MIMO technique offers a way to synthesize a complex array from a smaller number of transmit and receive antennas. This can be used for various advantages, such as forming a synthetic aperture larger than the physical size of the antenna for improved angle accuracy performance. Another use of MIMO technology is to provide an array with antenna spacing smaller than the physical size of the antennas, for ambiguity benefits. Many other uses and benefits of a MIMO radar design are possible.

In a MIMO Radar system, multiple transmit and receive antennas transmit and receive independent (i.e. orthogonal) radar-signals. The transmitted signals can be considered orthogonal if their cross-correlation along the propagation path is low, approaching zero. There are various methods to transmit and receive orthogonal signal waveforms including Time-Division Multiplexing (TDM), Frequency-Division Multiplexing (FDM), and Phase Modulation (PM). Each of these methods has performance/cost trade-offs.

U.S. Pat. No. 7,474,262 issued to Alland on Jan. 6, 2006 and entitled DIGITAL BEAMFORMING FOR AN ELECTRONICALLY SCANNED RADAR SYSTEM describes a MIMO radar system configured to operate using the TDM method, which results in a maximum degree of orthogonality between signals transmitted from multiple transmit antennas. The detection dynamic range will not be degraded by signal interference between transmitting antennas. However, TDM introduces the ineffective usage of the coherent processing interval (CPI) of the radar measurement. This will degrade the radar's object detection performance by reducing the detection sensitivity (through time multiplexing losses) and the ability to unambiguously measure Doppler across a wide interval (by increasing the time between pulses from a single transmit antenna).

To overcome the performance limitations of the TDM method, it may be desired to generate signals from multiple transmit antennas simultaneously but still separate the signals received simultaneously by each receive antenna to form multiple channels. This requires that multiple signals be generated with some level of orthogonality, transmit from multiple transmit antennas, and the superposition of these signals received by each receive antenna. These signals are then separated after being received. Multiple known methods exist to do this.

One method is Frequency Division Multiplexing. With this method, the transmit signal for each transmit antenna is offset in frequency from the transmit signals for the other transmit antennas. After down-conversion, there will be a frequency offset between the signals from the different Tx antennas. The cost of this approach is that an increased baseband bandwidth is required to sample the signals received from the multiple transmit antennas. Also, the unambiguous range coverage is impacted.

Another method to achieve orthogonality is to implement phase modulation of one transmit signal compared to another. This modulation may involve use of Bi-Phase Modulation with phase states of 0° and 180°, or Poly-Phase Modulation in which more phase states are used. Two classes of phase modulation are used. The first uses regular, periodic codes to shift the received signal in frequency, such as use of a square wave code. The downside of this approach is that the shift in frequency of the received signal from one object can interfere with the signal from another. To avoid this one can, for example, use an increased pulse repetition frequency (PRF) to ensure signals from one transmit antenna do not interfere with another. However, this alternative results in increased system cost and complexity.

Another method of using phase modulation is to modulate the phase of one transmit signal relative to another by, for example, a pseudo-random code. This method is referred to here as Pseudo-Random Phase Modulation (PRPM). By demodulating the received signal according to the transmit code applied to one of the transmit antennas, the signal from that transmit antenna can be recovered. By virtue of the differential phase modulation of the other transmit antennas, the signals from the other transmit antennas are suppressed. The demodulation process can be repeated for the same received signal according to the phase code applied to each transmit antenna. In this method, the composite received signal resulting from the superposition of the signals from multiple transmit antennas can be separated into its individual constituent elements. A limitation of this approach is that, upon demodulation for a given transmit antenna, the energy of the suppressed signals from the other transmit antennas is still present in the recovered signal for the given transmit antenna, but merely distributed across a frequency band.

The distributed energy from the suppressed signals present in the recovered signal is referred to herein as the residue. The residue arises from or is due to the lack of perfect orthogonality between the signals applied to each transmit antenna. The residue present in the recovered signal from a particular transmit antenna consists of the superposition of the individual residues from each of the other transmit antennas. The level or strength of the residue is related to the received signal levels and the degree of orthogonality between the transmit signals. In the case of phase coded waveforms, the cross-correlation of the phase codes used for each transmit antenna determines the degree of orthogonality between the transmit signals and also determines the shape of the frequency spectrum of the residue.

The presence of this residue limits the ability of the radar system to unambiguously extract the signal reflected from a smaller object in the presence of a signal reflected from a larger object. The residue level can be reduced by increasing the orthogonality (i.e. decreasing the cross-correlation) between the phase coded waveforms. A known approach for reducing the residue resulting from PRPM is to increase the phase code length to decrease the residue. However, for some designs, increasing the code length for significant improvement in residue may not be practical or may have cost and performance implications on the system design.

Another approach to reduce the residue has been described in a paper entitled Slow Time Random Phase-Coded Waveforms in MIMO OTHR by Zhiguo Zhao, Jianwen Chen, and Zheng Bao, that was published in the $10^{th}$ International Symposium on Antennas, Propagation & EM Theory (ISAPE), 2012. In this implementation, a method called Hierarchical Waveform Separation (HWS) is described to reduce the residue from a PRPM MIMO implementation. While this approach may achieve similar performance, it uses a matrix subspace projection method to identify and remove the residue from strong signals. However, its calculation is complex and time-consuming, and generally not practical for low-cost automotive radar.

SUMMARY OF THE INVENTION

Described herein is a radar signal processing technique that improves the limitation of pseudo-random phase modulation (PRPM) of a multiple-input-multiple-output (MIMO) radar system by reducing the residue level.

In accordance with one embodiment, a Pseudo-Random Phase Modulation (PRPM) multiple-input-multiple-output (MIMO) radar system suitable for use on an automated vehicle is provided. The system includes a first transmit-antenna that transmits a first transmit-signal generated by a first PRPM-code, a second transmit-antenna that transmits a second transmit-signal generated by a second PRPM-code, a receive-antenna used to detect a first reflected-signal arising from the first transmit-signal and a second reflected-signal arising from the second transmit-signal, and a controller. The controller is in communication with the receive-antenna and is operable to generate the first PRPM-code and the second PRPM-code. The controller is configured to generate a first sub-channel-output based on a down-converted-signal from the receive-antenna and a complex conjugate of the first PRPM-code, generate a second sub-channel-output based on the down-converted-signal from the receive-antenna and a complex conjugate of the second PRPM-code, determine a first residue-signal based on the second sub-channel-output, and determine a first residue-removed-signal by subtracting the first residue-signal from the first sub-channel-output.

In one embodiment, the first residue-signal is determined based on a convolution of the second sub-channel-output with a frequency transformation of a cross-correlation of the first PRPM-code and the second PRPM-code.

In an alternative embodiment, the first residue-signal is determined based on a first modulation of an inverse-frequency-transform of the second sub-channel-output by the second PRPM-code and a complex conjugate of the first PRPM-code, and a first frequency transformation of the first modulation.

In another embodiment, a method to operate a Pseudo-Random Phase Modulation (PRPM) multiple-input-multiple-output (MIMO) radar system suitable for use on an automated vehicle is provided. The method includes the steps of providing a first transmit-antenna that transmits a first transmit-signal generated by a first PRPM-code; providing a second transmit-antenna that transmits a second transmit-signal generated by a second PRPM-code; and providing a receive-antenna used to detect a first reflected-signal arising from the first transmit-signal and a second reflected-signal arising from the second transmit-signal. The method also includes the steps of generating the first PRPM-code and the second PRPM-code, generating a first sub-channel-output based on a down-converted-signal from the receive-antenna and the first PRPM-code, generating a second sub-channel-output based on the down-converted-signal from the receive-antenna and the second PRPM-code, determining a first residue-signal based on the second sub-channel-output, and determining a first residue-removed-signal by subtracting the first residue-signal from the first sub-channel-output.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
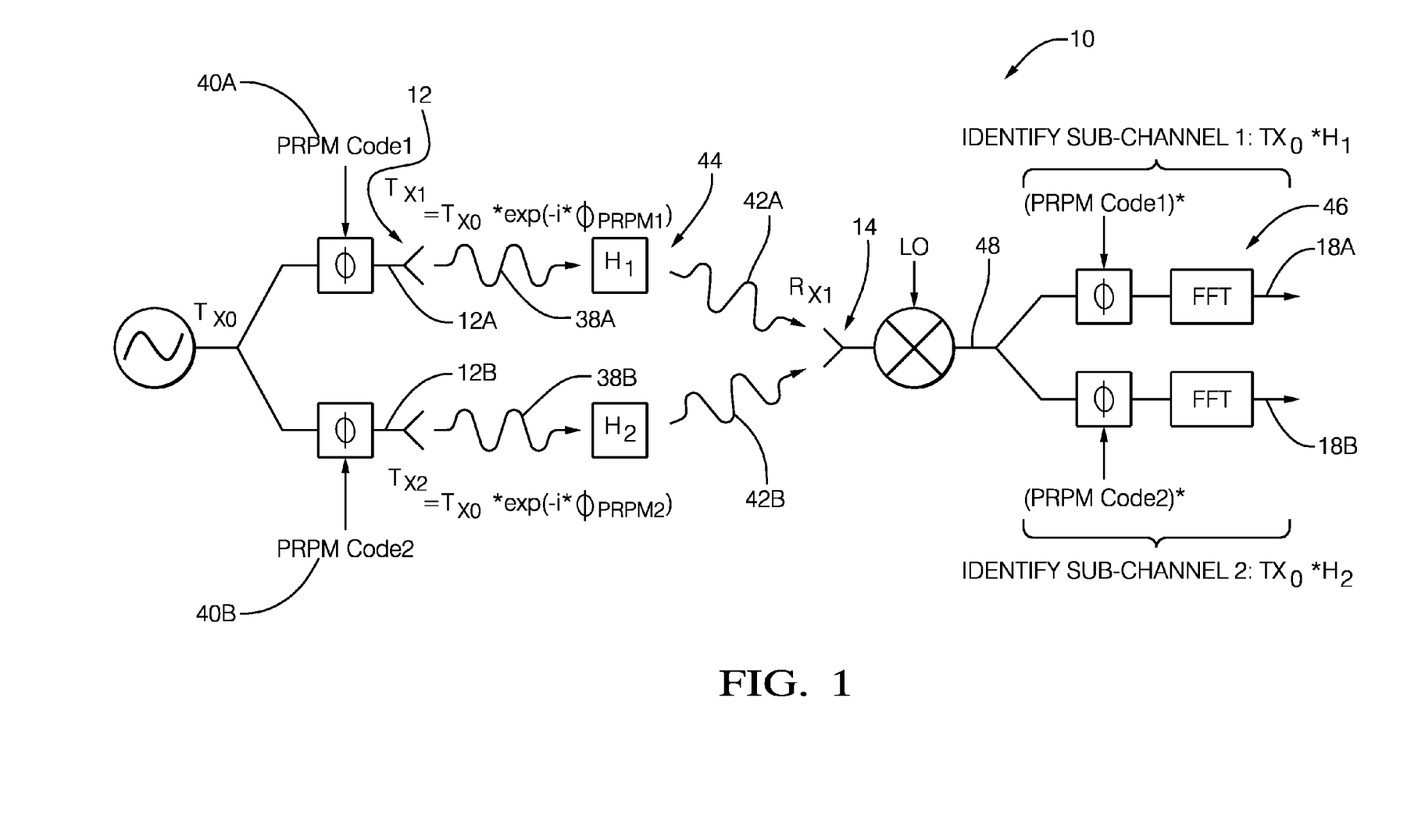
FIG. 1 is a diagram of a Pseudo-Random Phase Modulation (PRPM) multiple-input-multiple-output (MIMO) radar system in accordance with one embodiment.
Figure 3:
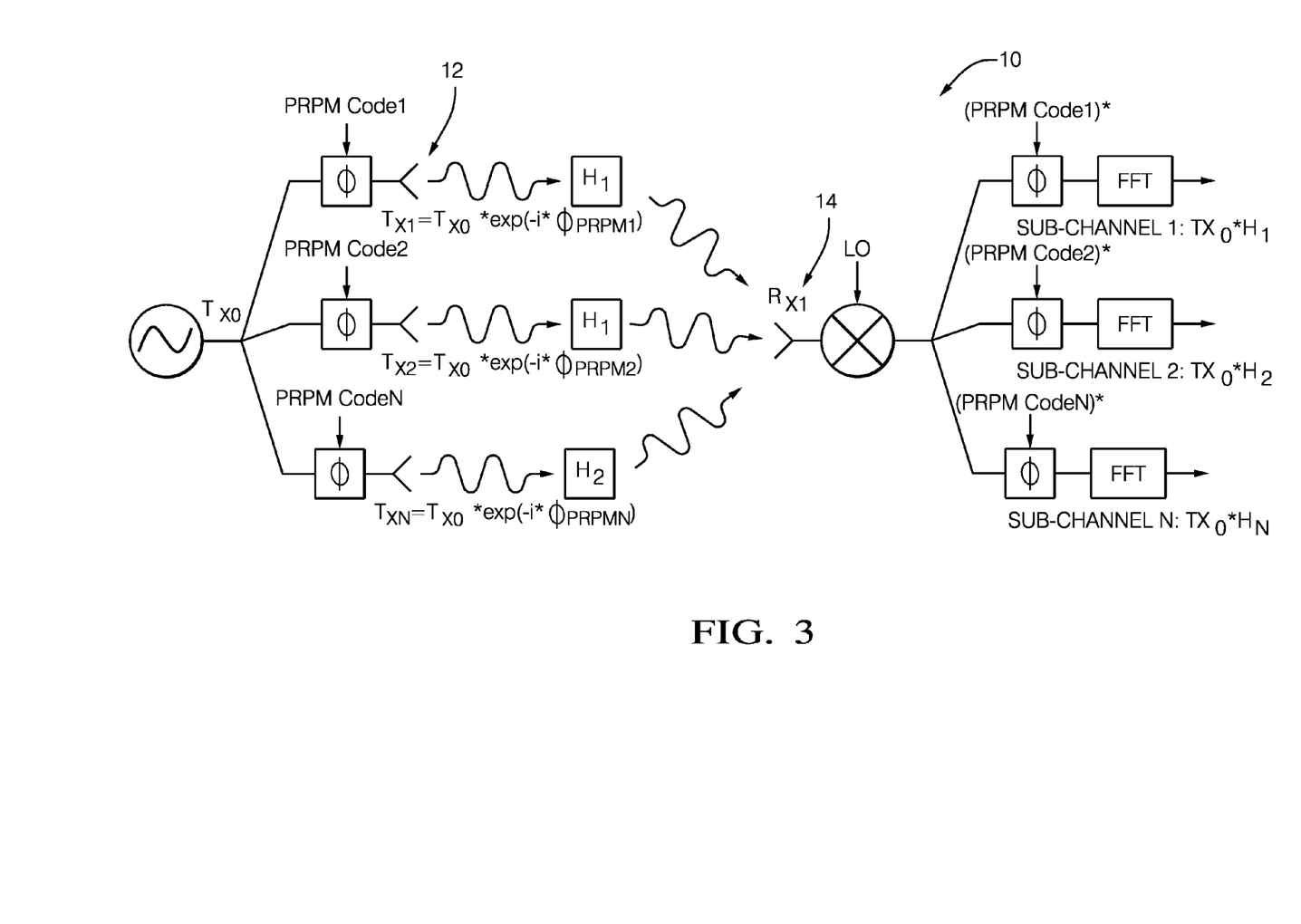
FIG. 3 is an alternative diagram of the system of FIG. 1 in accordance with one embodiment.

FIGS. 1 and 3 illustrate non-limiting examples of a PRPM MIMO Radar system, hereafter referred to as the system 10, with sub-channel extraction for the simple case of two transmit antennas and one receive antenna. A paper entitled

*MIMO Imaging Radar with Enhanced Range-Azimuth Sidelobe Suppression* by T. Takayama, Y. Tokieda, and H. Sugawara, published in the Proc. IET Int. Radar Conf. (2012) describes an implementation of a pseudo-random phase code both within a chirp and between chirps for a MIMO radar system that illustrates residue for a single chirp and for integrated chirps. Pseudo-Random Phase Modulation is a method of digital modulation in which the phase of a signal sent to each transmit antenna is randomly varied in order to achieve a degree of orthogonality between simultaneously transmitted and received signals. The degree of orthogonality between signals depends on the ability of the phase modulation to distribute energy of the signals to be later effectively suppressed across a frequency spectrum.

The performance of this technique can depend on the number and distribution of phase states used in the PRPM method. For instance, the average residue for a single sequence is a function of the length of the code used to generate the phase modulation. This residue can cause undesired limitations in a MIMO-radar system using the PRPM method. Specifically, it reduces the detection dynamic range. This means, a signal from a target with small back scattering characteristic can be masked by the signal from a target with large back scattering characteristic, preventing detection of the smaller signal. The system 10 includes an improvement over the prior art called a Residue Estimation and Subtraction Technique (REST) that significantly improves the limitation of the detection dynamic range of the MIMO-radar system that operates using the PRPM method.

Takayama describes a technique used phase coding both within and across chirps to better suppress the residue. This method does reduce residue, but it requires certain capabilities in the radar which add cost and complexity. First, it requires a transceiver that can modulate phase continuously during a chirp, which is not always possible in low-cost transceivers targeted at the automotive market. Also, because phase modulation will preclude the use of simple analog high pass filtering to attenuate the amplitude of short range signals, the required dynamic range of the baseband processing of the radar is increased. Further, although the residue is reduced, phase coding within a chirp allows for the possibility that a very strong signal at any other range and Doppler could mask a smaller object at any other range and Doppler, which is an unacceptable tradeoff for some systems. Finally, because the channels are separated during a range FFT, the system RAM requirements are higher for this type of coding. The improvement described herein provides a low residue without the costs and drawbacks of coding within a chirp. The improvement described herein can also be applied on the phase coding technique within a chirp, and provides further improvement of the residue level.

The Residue Estimation and Subtraction Technique (REST) improves the dynamic range of the MIMO radar system that utilizes a Pseudo-Random Phase Modulated (PRPM) pulse compressed waveform such as a linear FM fast chirp waveform. In general, the system 10 is one in which signals originating from two or more transmit-antennas 12 are received by one or more receive-antennas 14. Each of transmit-antennas 12 is simultaneously transmitting while employing phase modulation using unique pseudo-random codes to form separate sub-channels, one per transmit antenna. The first and subsequent sub-channels can be defined as the signal received by each instance of the receive-antennas 14 separated into the constituent signals from the first and subsequent transmit antennas, respectively (via demodulation by the complex conjugate of the phase code corresponding to the first and subsequent transmit antennas). While only a single instance of the receive-antennas 14 is illustrated, this is only to simplify the illustration and explanation of the system 10. The target signals contained within each sub-channel are then identified, for instance, by Fourier Transform.

For a PRPM type radar system, the ability to identify the signals within one sub-channel is limited by the presence of a residue from the other sub-channels that are being suppressed. In particular, the ability to measure multiple signals of different amplitudes is impeded due to the limited dynamic range caused by the presence of residue from other sub-channels. The system 10 uses the signals identified in each sub-channel in the presence of residue, and uses those signals to estimate the residue created during the extraction of all other sub-channels. Then, this estimated residue is subtracted to improve the ability to identify multiple signals within each sub-channel. As a result of the residue subtraction, a PRPM MIMO radar system will have an improved detection capability of small target signals that were previously buried under the residue of large target signals. REST thereby increases the detection dynamic range of the PRPM MIMO radar system.

A generic example of a PRPM type radar system includes M transmit antennas that are simultaneously transmitting signals that are each modulated by a different pseudorandom phase code. Through use of different codes, the signal from each transmit antenna forms a unique sub-channel. The superposition of these sub-channels are received by N receive antennas. The signal received is separated into sub-channels by demodulating according to the phase code of each sub-channel.

Figure 2A:
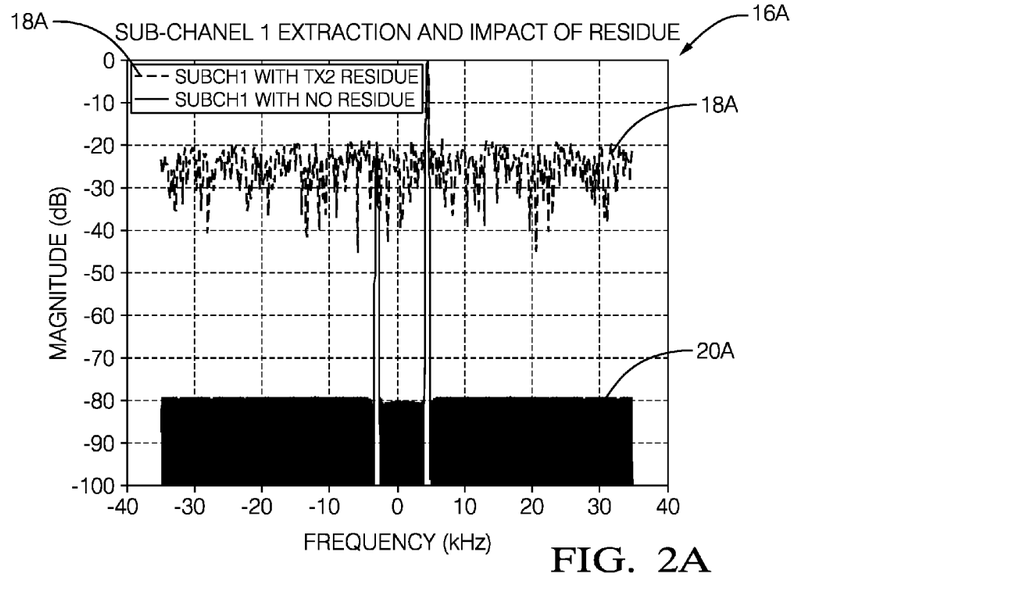
FIGS. 2A and 2B are graphs of signals that may be present in the system of FIG. 1 in accordance with one embodiment.
Figure 2B:
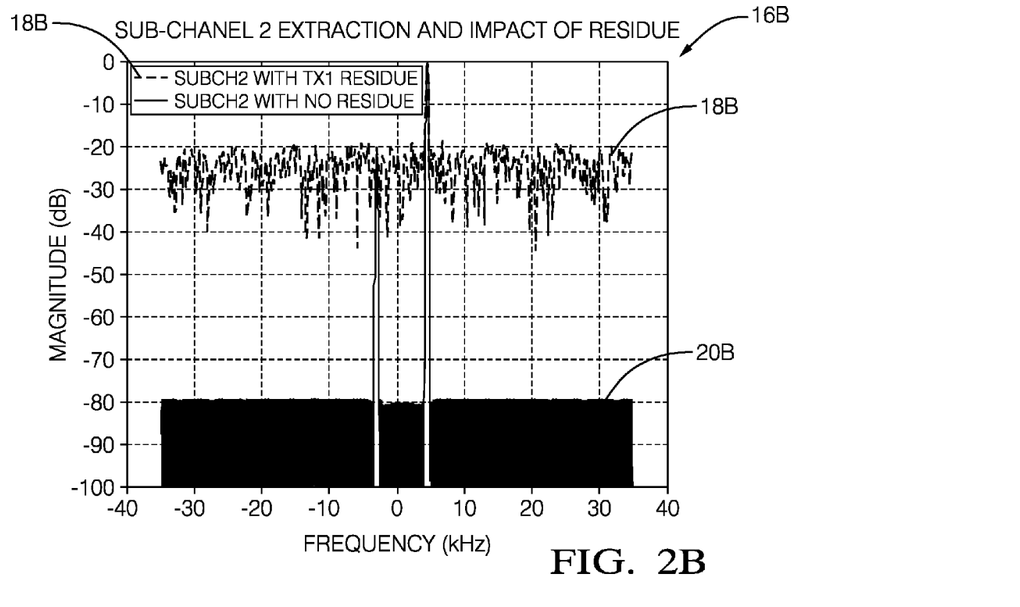

FIGS. 2A and 2B illustrate graphs 16A and 16B, respectively. These are non-limiting examples of a first sub-channel-output 18A and a second sub-channel-output 18B, which both include the residue described above. The unique phase codes for each other sub-channel results in suppression of those other sub-channels by spreading energy over the frequency domain. FIGS. 2A and 2B also illustrate a first residue-free-signal 20A and a second residue-free-signal 20B for reference. For each of the sub-channels, the technique by which these are determined or obtained will be explained in more detail below.

Figure 4:
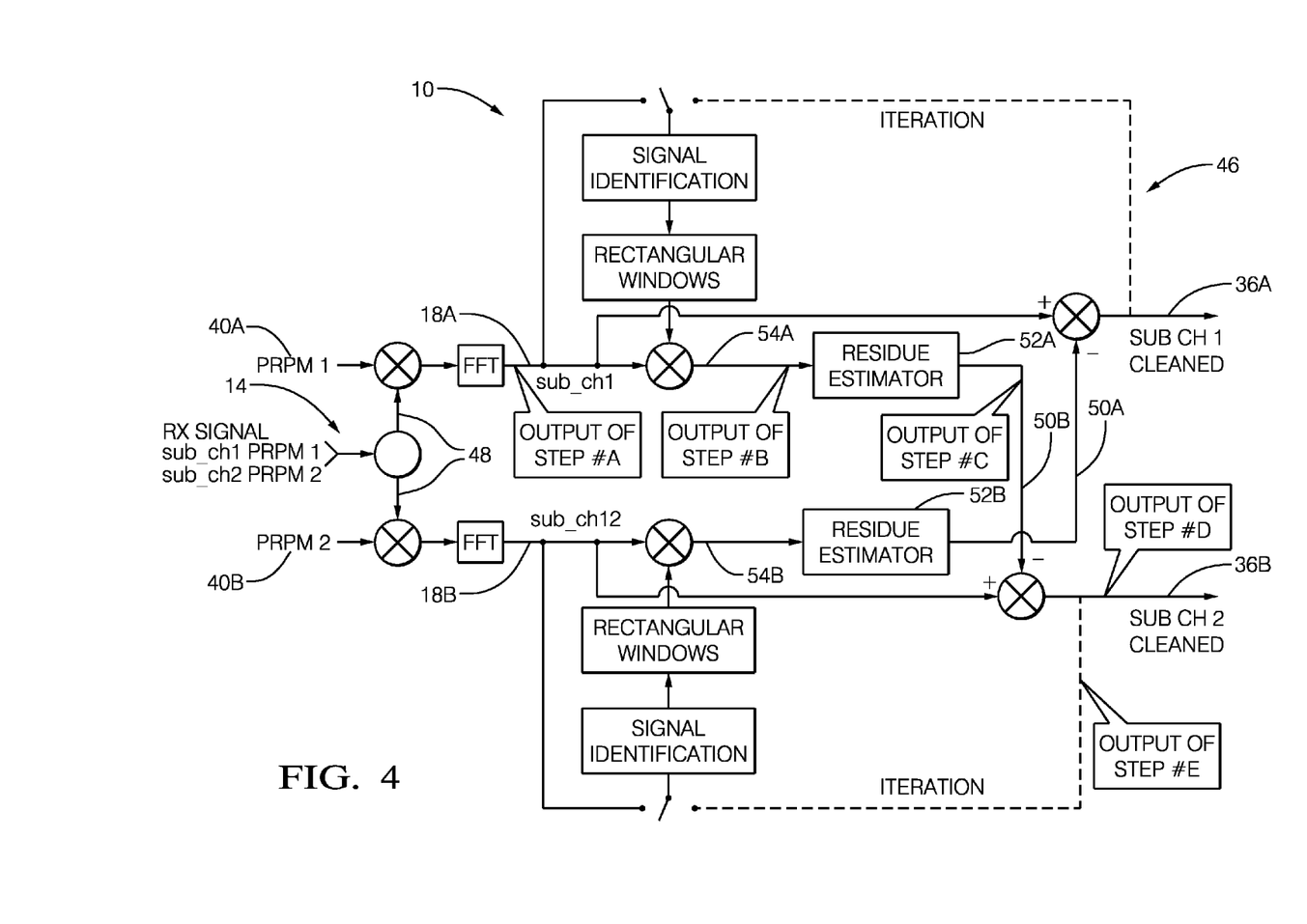
FIG. 4 is a Residue Estimation and Subtraction Technique (REST) signal processing diagram of the system of FIG. 1 in accordance with one embodiment.

FIG. 4 illustrates further non-limiting details of the system 10. The Residual Estimation and Subtraction (REST) approach uses the following signal processing steps.

Step A) Demodulate the receive signal by a complex conjugation of the various phase codes to form sub-channels. Fourier transform processing can be then used to transform the demodulated sub-channel signals to the frequency domain, thereby outputting the first sub-channel-output 18A and the second sub-channel-output 18B.

Step B) Identify signals in sub-channels. This can be done by identifying frequency bins that are above the peak residue from other channels. The signals are then isolated from the residue by using rectangular filters in the frequency domain to output an output signal 54A of a first frequency-domain-modulation (54A) and an output signal 54B of a second frequency-domain-modulation (54B), which will be described in more detail below.

Figure 7A:
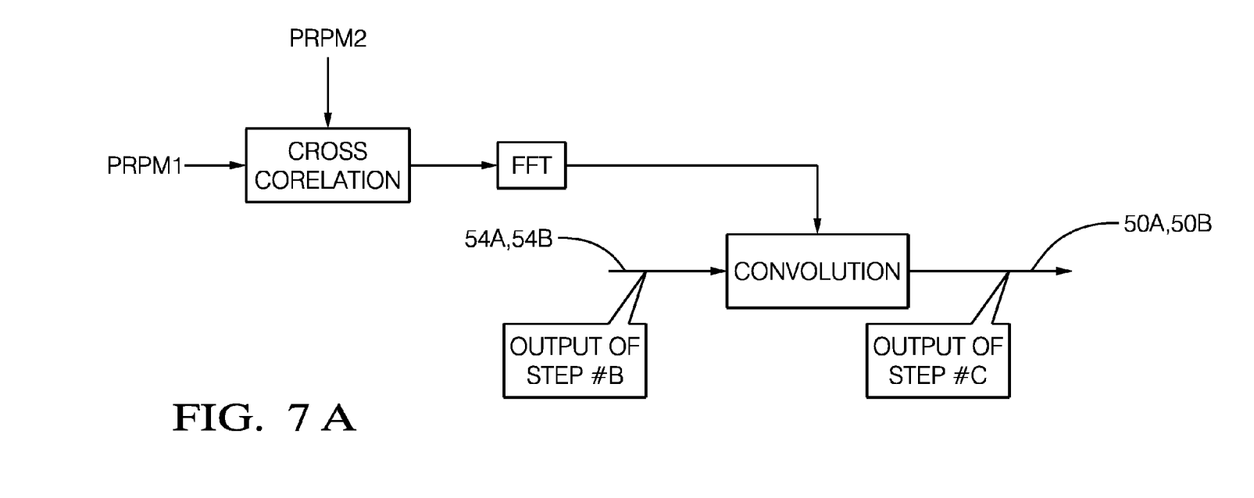
FIG. 7A is a diagram of details of the residue estimation function of the REST signal processing diagram of FIG. 4 in accordance with one embodiment.
Figure 7B:
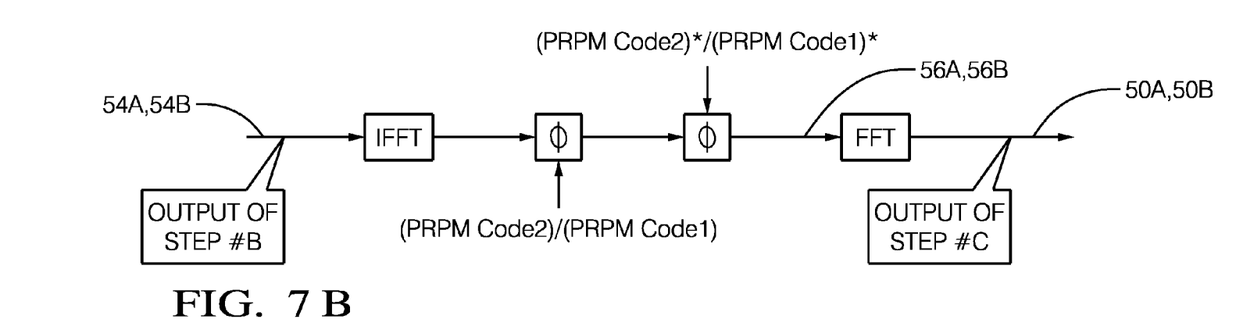
FIG. 7B is an alternative diagram of details of the residue estimation function of the REST signal processing diagram of FIG. 4 in accordance with one embodiment.

Step C) Estimate the residue that would be generated by each sub-channel when forming other sub-channels. This can be done by 2 different methods, which are equivalent, but require different implementations. One option illustrated in FIG. 7A is to, for each sub-channel, determine the cross-correlation between phase codes from all other sub-channels, calculate the Fast Fourier Transform (FFT) of each resulting cross-correlation phase code, and then convolve it with the signal output from step B. The other option illustrated in FIG. 7B is to convert the signal output from step B to the time-domain by, for example, a (reduced dimension) inverse FFT, and modulate the resulting time-domain signal with both the complex conjugate of the original phase code applied to the sub-channel and the phase code that was applied to extract another sub-channel, and then convert the modulated signals back to the frequency domain by, for example, an FFT.

Step D) For each sub-channel formed in step A, subtract the estimated residue from each of the corresponding suppressed sub-channels to produce the first residue-removed-signal 36A and the second residue-removed-signal 36B.

Step E) If desired, performance can be improved by repeating steps B through D, using as input the sub-channel data after subtraction of the estimated residues. Note that the REST processing flow steps A to E are indicated graphically in FIG. 4. The labels showing the outputs of each of steps #A through #E trace the processing flow for residue estimation and subtraction pertaining to the second residue-removed-signal 36B. The residue in sub-channel-two is estimated from the sub-channel-one FFT-output, i.e. the first sub-channel-output 18A. The estimated residue in sub-channel-two is then subtracted from the sub-channel-two FFT-output, i.e. the second sub-channel-output 18B. FIG. 4 also shows the reciprocal REST processing flow pertaining to the first residue-removed-signal 36A, although the outputs of each of steps #A through #E are not explicitly labeled.

Figure 5:
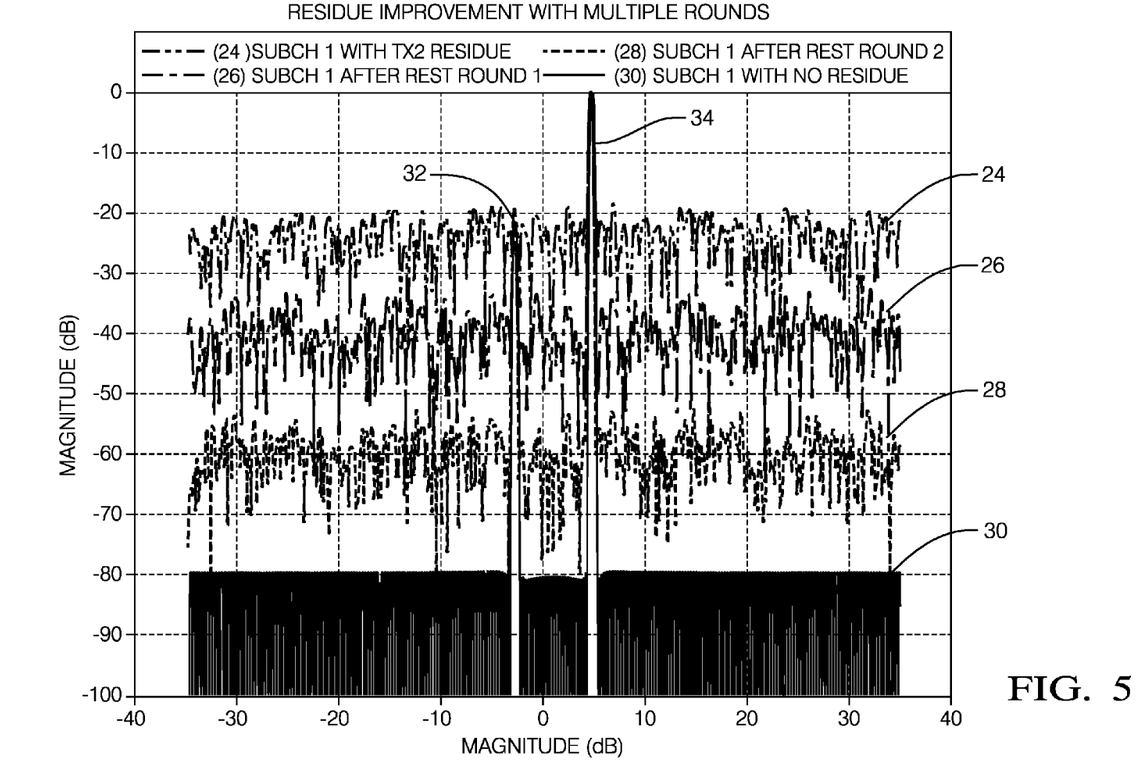
FIG. 5 is a graph of signals that may be present in the system of FIG. 1 in accordance with one embodiment.
Figure 6A:
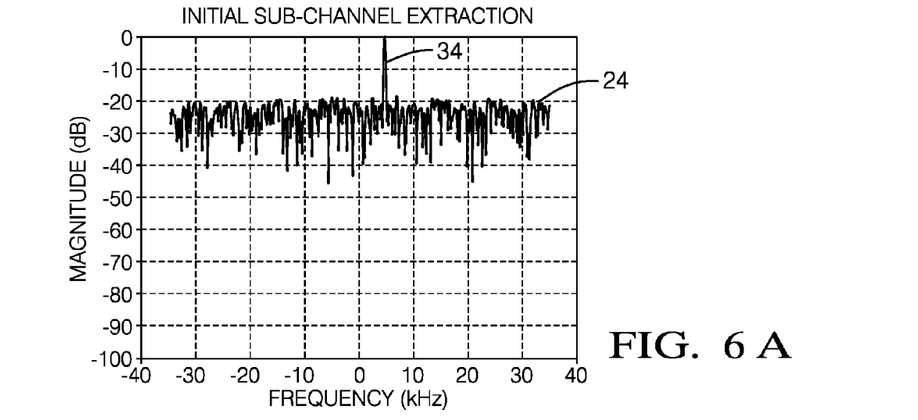
FIG. 6A is a graph of a signal that may be present in the system of FIG. 1 in accordance with one embodiment.
Figure 6B:
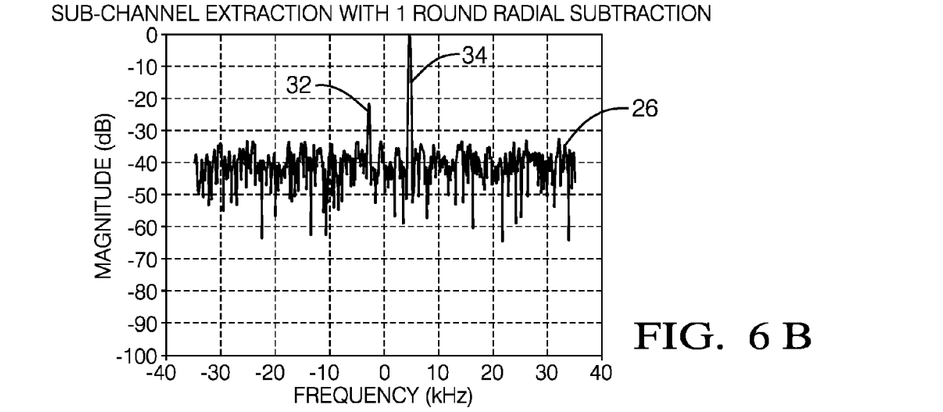
FIG. 6B is a graph of a signal that may be present in the system of FIG. 1 in accordance with one embodiment.
Figure 6C:
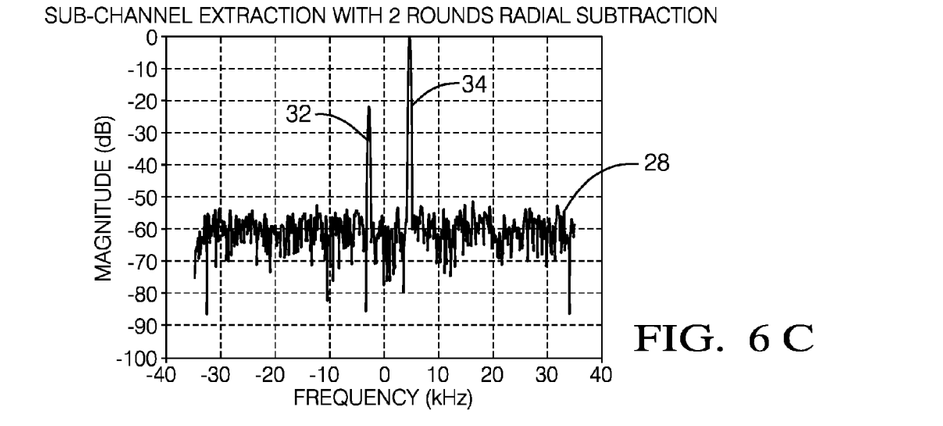
FIG. 6C is a graph of a signal that may be present in the system of FIG. 1 in accordance with one embodiment.

FIGS. 5, 6A, 6B, and 6C illustrate a non-limiting example of performance of the REST. In this example, two signals were present, a smaller signal 32 that measures about 22 dB below a larger signal 34. The smaller signal 32 was not visible in the original sub-channel extraction 24, as it was covered by the residue from the other sub-channel. After REST was executed once to produce a first iteration 26 (FIG. 6B), the smaller signal 32 is visible. After a second iteration 28 (FIG. 6C), the residue is reduced even further so the smaller signal 32 is more evident. FIG. 5 also shows a best-case 30 which is what the signal frequency spectrum would look like if there was no residue at all, i.e. if only one of the transmit-antennas 12 transmitted a signal. It could be considered that the ideal output of this process with a high number of iterations would be the green plot. It is theorized that if the iterative process is repeated numerous times, more than 30 times for example, the signal output by the REST algorithm approaches that of the best-case 30 shown in FIG. 5.

Referring again to FIGS. 1 and 4, and by extension FIG. 3, a Pseudo-Random Phase Modulation (PRPM) multiple-input-multiple-output (MIMO) radar system (the system 10) suitable for use on an automated vehicle (not shown) is shown and further described. A first transmit-antenna 12A transmits a first transmit-signal 38A generated by a first PRPM-code 40A, and a second transmit-antenna 12B transmits a second transmit-signal 38B generated by a second PRPM-code 40B. A receive-antenna 14 detects a first reflected-signal 42A arising from the first transmit-signal 38A reflecting off objects 44, and a second reflected-signal 42B arising from the second transmit-signal 38B reflecting off objects 44.

A controller 46 in communication with the transmit-antennas 12 and the receive-antenna 14 is operable to generate the first PRPM-code 40A and the second PRPM-code 40B. The controller 46 may include a processor such as a microprocessor or other control circuitry such as analog and/or digital control circuitry including an application specific integrated circuit (ASIC) for processing data as should be evident to those in the art. The controller 46 may include memory, including non-volatile memory, such as electrically erasable programmable read-only memory (EEPROM) for storing one or more routines, thresholds, and captured data. The one or more routines may be executed by the processor to perform the steps A-D and others, as described herein.

In general, the controller 46 is configured to generate the first sub-channel-output 18A based on a down-converted-signal 48 from the receive-antenna 14 and the first PRPM-code 40A, and generate the second sub-channel-output 18B based on the down-converted-signal 48 from the receive-antenna and the second PRPM-code 40B. The controller 46 is also configured to determine a first residue-signal 50A based on the second sub-channel-output 18B, and determine the first residue-removed-signal 36A based on subtracting the first residue-signal 50A from the first sub-channel-output 18A. The first residue-signal 50A is determined based on a convolution of an output signal 54B of a second frequency-domain-modulation (54B) with a frequency transformation of a cross-correlation of the first PRPM-code 40A and the second PRPM-code 40B (FIG. 7A). The second frequency-domain-modulation filters relevant signals from second sub-channel-output 18B using rectangle windows that have maximum values at the relevant signal positions and minimum values at the noise positions of the second sub-channel-output 18B (FIG. 4).

In a reciprocal fashion, the controller 46 is further configured to determine a second residue-signal 50B based on the first sub-channel-output 18A, and determine the second residue-removed-signal 36B based on subtracting the second residue-signal 50B from the second sub-channel-output 18B. The second residue-signal 50B is determined based on a convolution of the output signal 54A of the first frequency-domain-modulation (54A) with a frequency transformation of a cross-correlation of the second PRPM-code 40B and the first PRPM-code 40A (FIG. 7A). The first frequency-domain-modulation filters relevant signals from first sub-channel-output 18A using rectangle windows that have maximum values at the relevant signal positions and minimum values at the noise positions of the first sub-channel-output 18A (FIG. 4).

Continuing to refer to FIG. 4, in an alternative method the first residue-signal 50A is determined based on a first time-domain-modulation 56A (FIG. 7B) of an inverse-frequency-transform of the output signal 54B of a second frequency-domain-modulation by the second PRPM-code 40B and a complex conjugate of the first PRPM-code 40A, and a first frequency transformation of the first time-domain-modulation 56A. Similarly, the second residue-signal 50B is determined based on a second time-domain-modulation 56B (FIG. 7B) of an inverse-frequency-transform of the output signal 54B of a second frequency-domain-modulation by the first PRPM-code 40A and a complex conjugate of the second PRPM-code 40B, and a second frequency transformation of the second time-domain-modulation 56B.

Accordingly, a PRPM MIMO radar system (the system 10) and a method of operating the system 10 are provided. The system transmits simultaneously from multiple antennas which allows for improved Doppler ambiguity and improved sensitivity with no time multiplexing losses. However, in previous PRPM MIMO Radars, the residue from suppressed sub-channels limits the dynamic range of the measurement, which can prevent the detection of small objects in the presence of larger ones. This limitation of the detection dynamic range is improved by the REST algorithm described herein. Performing REST on the received signal frequency spectrum of simultaneously transmitted and PRPM-modulated waveforms will improve detection dynamic range, which otherwise was limited by the residue of the PRPM-method. In particular, REST improves detection of object(s) with smaller backscattering characteristic (or RCS) in the presence of objects with larger backscattering characteristic (or RCS). This can be exploited to enhance detection and discrimination of automotive radar on-road objects such as pedestrian, cyclist, motorcycle, and animals in the presence of on-road objects such as cars, SUVs, trucks, and trailers. Use of REST to reduce the residue can allow for an implementation which only modulates phase across chirps and not during them, as was used in prior art. This avoids complications and costs associated with phase modulation during a chirp. By employing REST to reduce the impact of residue on performance, options for use of an increased number of transmit channels become viable. Increasing the number of transmit channels opens up a large number of options for improved MIMO synthetic array formation.

While this invention has been described in terms of the preferred embodiments thereof, it is not intended to be so limited, but rather only to the extent set forth in the claims that follow.

We claim:

1. A Pseudo-Random Phase Modulation (PRPM) multiple-input-multiple-output (MIMO) radar system suitable for use on an automated vehicle, said system comprising:
 a first transmit-antenna that transmits a first transmit-signal generated by a first PRPM-code;
 a second transmit-antenna that transmits a second transmit-signal generated by a second PRPM-code;
 a receive-antenna used to detect a first reflected-signal arising from the first transmit-signal and a second reflected-signal arising from the second transmit-signal; and
 a controller in communication with the receive-antenna and operable to generate the first PRPM-code and the second PRPM-code, said controller configured to
 generate a first sub-channel-output based on a down-converted-signal from the receive-antenna and the first PRPM-code,
 generate a second sub-channel-output based on the down-converted-signal from the receive-antenna and the second PRPM-code,
 determine a first residue-signal based on the second sub-channel-output, and
 determine a first residue-removed-signal by subtracting the first residue-signal from the first sub-channel-output.

2. The system in accordance with claim 1, wherein the first residue-signal is determined based on a convolution of an output signal of a second frequency-domain-modulation with a frequency transformation of a cross-correlation of the first PRPM-code and the second PRPM-code.

3. The system in accordance with claim 1, wherein the controller is further configured to
 determine a second residue-signal based on the first sub-channel-output, and
 determine a second residue-removed-signal based on subtracting the second residue-signal from the second sub-channel-output.

4. The system in accordance with claim 3, wherein the second residue-signal is determined based on a convolution of an output signal of a first frequency-domain-modulation with a frequency transformation of a cross-correlation of the second PRPM-code and the first PRPM-code.

5. The system in accordance with claim 1, wherein the first residue-signal is determined based on a first time-domain-modulation of an inverse-frequency-transform of an output signal of a second frequency-domain-modulation by the second PRPM-code and a complex conjugate of the first PRPM-code, and a first frequency transformation of the first time-domain-modulation.

6. The system in accordance with claim 1, wherein the second residue-signal is determined based on a second time-domain-modulation of an inverse-frequency-transform of an output signal of a first frequency-domain-modulation by the first PRPM-code and a complex conjugate of the second PRPM-code, and a second frequency transformation of the second time-domain-modulation.

7. The system in accordance with claim 1, wherein the controller is further configured to repeat multiple-iterations of steps to determine the first residue-removed-signal.

8. A method to operate a Pseudo-Random Phase Modulation (PRPM) multiple-input-multiple-output (MIMO) radar system suitable for use on an automated vehicle, said method comprising:
 providing a first transmit-antenna that transmits a first transmit-signal generated by a first PRPM-code;
 providing a second transmit-antenna that transmits a second transmit-signal generated by a second PRPM-code;
 providing a receive-antenna used to detect a first reflected-signal arising from the first transmit-signal and a second reflected-signal arising from the second transmit-signal;
 generating the first PRPM-code and the second PRPM-code;
 generating a first sub-channel-output based on a down-converted-signal from the receive-antenna and the first PRPM-code;
 generating a second sub-channel-output based on the down-converted-signal from the receive-antenna and the second PRPM-code;
 determining a first residue-signal based on the second sub-channel-output; and
 determining a first residue-removed-signal by subtracting the first residue-signal from the first sub-channel-output.

* * * * *